United States Patent
Bansal et al.

(10) Patent No.: US 8,147,587 B2
(45) Date of Patent: Apr. 3, 2012

(54) ENHANCED MERCURY CAPTURE FROM COAL-FIRED POWER PLANTS IN THE FILTRATION BAGHOUSE USING FLUE GAS TEMPERATURE AS PROCESS CONTROL KNOB

(75) Inventors: Vishal Bansal, Overland Park, KS (US); Peter Martin Maly, Lake Forest, CA (US); Robert Warren Taylor, Ponte Vedra Beach, FL (US)

(73) Assignee: BHA Group, Inc., Kansas City, MO (US)

( * ) Notice: Subject to any disclaimer, the term of this patent is extended or adjusted under 35 U.S.C. 154(b) by 0 days.

(21) Appl. No.: 13/087,773

(22) Filed: Apr. 15, 2011

(65) Prior Publication Data

US 2011/0209609 A1 Sep. 1, 2011

(51) Int. Cl.
*B01D 46/46* (2006.01)
(52) U.S. Cl. ......... 95/8; 96/8; 96/413; 96/417; 110/185; 110/345
(58) Field of Classification Search ............. 95/8; 96/8, 96/413, 417; 110/185, 345
See application file for complete search history.

(56) References Cited

U.S. PATENT DOCUMENTS

| | | | | |
|---|---|---|---|---|
| 4,889,698 A * | 12/1989 | Moller et al. | ................ | 423/210 |
| 5,505,766 A | 4/1996 | Chang | | |
| 5,514,593 A * | 5/1996 | Townsend et al. | ............. | 436/77 |
| 6,521,021 B1 * | 2/2003 | Pennline et al. | ................ | 95/134 |
| 6,579,507 B2 * | 6/2003 | Pahlman et al. | ............. | 423/210 |
| 6,953,494 B2 * | 10/2005 | Nelson, Jr. | ....................... | 95/134 |
| 6,974,565 B2 * | 12/2005 | Pahlman et al. | ............. | 423/210 |
| 7,494,632 B1 * | 2/2009 | Klunder | ....................... | 423/210 |
| 7,507,083 B2 * | 3/2009 | Comrie | ............................ | 431/2 |
| 7,531,153 B2 * | 5/2009 | Lissianski et al. | ............ | 423/210 |
| 7,674,442 B2 * | 3/2010 | Comrie | ......................... | 423/210 |
| 7,708,803 B2 * | 5/2010 | Berry et al. | ....................... | 95/59 |
| 7,756,591 B2 * | 7/2010 | Jia et al. | ......................... | 700/29 |
| 7,776,301 B2 * | 8/2010 | Comrie | ..................... | 423/242.1 |
| 2002/0117094 A1 * | 8/2002 | Teller et al. | ................... | 110/345 |
| 2010/0300336 A1 * | 12/2010 | Thulen et al. | ................. | 110/345 |

* cited by examiner

*Primary Examiner* — Jason M Green
*Assistant Examiner* — Anthony Shumate
(74) *Attorney, Agent, or Firm* — Pearne & Gordon LLP

(57) ABSTRACT

A system and associated method for improved mercury removal from a flow containing combustion exhaust. The system includes a filtration arrangement through which the flow proceeds to remove material, including mercury, from the flow. The system includes a sensor arrangement sensing a mercury concentration within the flow downstream of the filtration arrangement and providing a signal indicative of the sensed mercury concentration. The system includes an adjustable temperature control arrangement changing a temperature of the combustion exhaust proceeding to the filtration arrangement in response to the signal indicative of the sensed mercury concentration to change an amount of mercury being removed from the flow.

18 Claims, 5 Drawing Sheets

ENHANCED MERCURY CAPTURE FROM COAL-FIRED POWER PLANTS IN THE FILTRATION BAGHOUSE USING FLUE GAS TEMPERATURE AS PROCESS CONTROL KNOB

BACKGROUND OF THE INVENTION

1. Field of the Invention

The present invention relates generally to air filtration, and more particularly to air filtration that provides for improved fly ash and/or mercury emission control.

2. Discussion of the Prior Art

Air filters are known and used in many different applications, including use within filtration arrangements associated with combustion devices, such as coal-fired boilers. The air filters are capable of filtering particulate matter, such as fly ash, from combustion exhaust.

It is known that some combustion fuels, such as coal, include mercury (Hg). It is desirable to control the amount of mercury proceeding from a combustion device and through an air filter. It is known to add a sorbent, such as activated carbon, into the combustion exhaust gas in an effort to help entrap the mercury and thus remove the mercury from the combustion exhaust. However, there may be some aspects connected with the use of sorbent that are disfavorable, such as the cost of obtaining the sorbent.

In addition to a general desire to entrap mercury, there may also a desire to entrap mercury despite fluctuation of a concentration of mercury and/or other fluctuations that have an influence on the entrapment of mercury. Examples of such other fluctuations that have an influence on the entrapment of mercury may include variations in the fly ash in the combustion exhaust, gas chemistry within the combustion exhaust, combustion exhaust gas flow rate, filter media condition (e.g., deterioration thereof), dust-cake build-up, etc.

It would be beneficial to be able to control mercury entrapment in a desirable manner.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a system for improved mercury removal from a flow containing combustion exhaust. The system includes a filtration arrangement through which the flow proceeds to remove material, including mercury, from the flow. The system includes a sensor arrangement sensing a mercury concentration within the flow downstream of the filtration arrangement and providing a signal indicative of the sensed mercury concentration. The system includes an adjustable temperature control arrangement changing a temperature of the combustion exhaust proceeding to the filtration arrangement in response to the signal indicative of the sensed mercury concentration to change an amount of mercury being removed from the flow.

In accordance with another aspect, the present invention provides a system for improved mercury removal from a flow containing combustion exhaust. The system includes filtration means for removing material, including mercury, from the flow proceeding through the filtration means. The system includes sensor means for sensing a mercury concentration within the flow downstream of the filtration means and for providing a signal indicative of the sensed mercury concentration. The system includes temperature control means for changing a temperature of the combustion exhaust proceeding to the filtration means in response to the signal indicative of the sensed mercury concentration to change an amount of mercury being removed from the flow.

In accordance with another aspect, the present invention provides a method for improved mercury removal from a flow containing combustion exhaust. The method includes filtering the flow to remove material, including mercury, from the flow proceeding through a filtration arrangement. The method includes sensing a mercury concentration within the flow downstream of the filtration arrangement and for providing a signal indicative of the sensed mercury concentration. The method includes changing a temperature of the combustion exhaust proceeding to the filtration arrangement in response to the signal indicative of the sensed mercury concentration to change an amount of mercury being removed from the flow.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
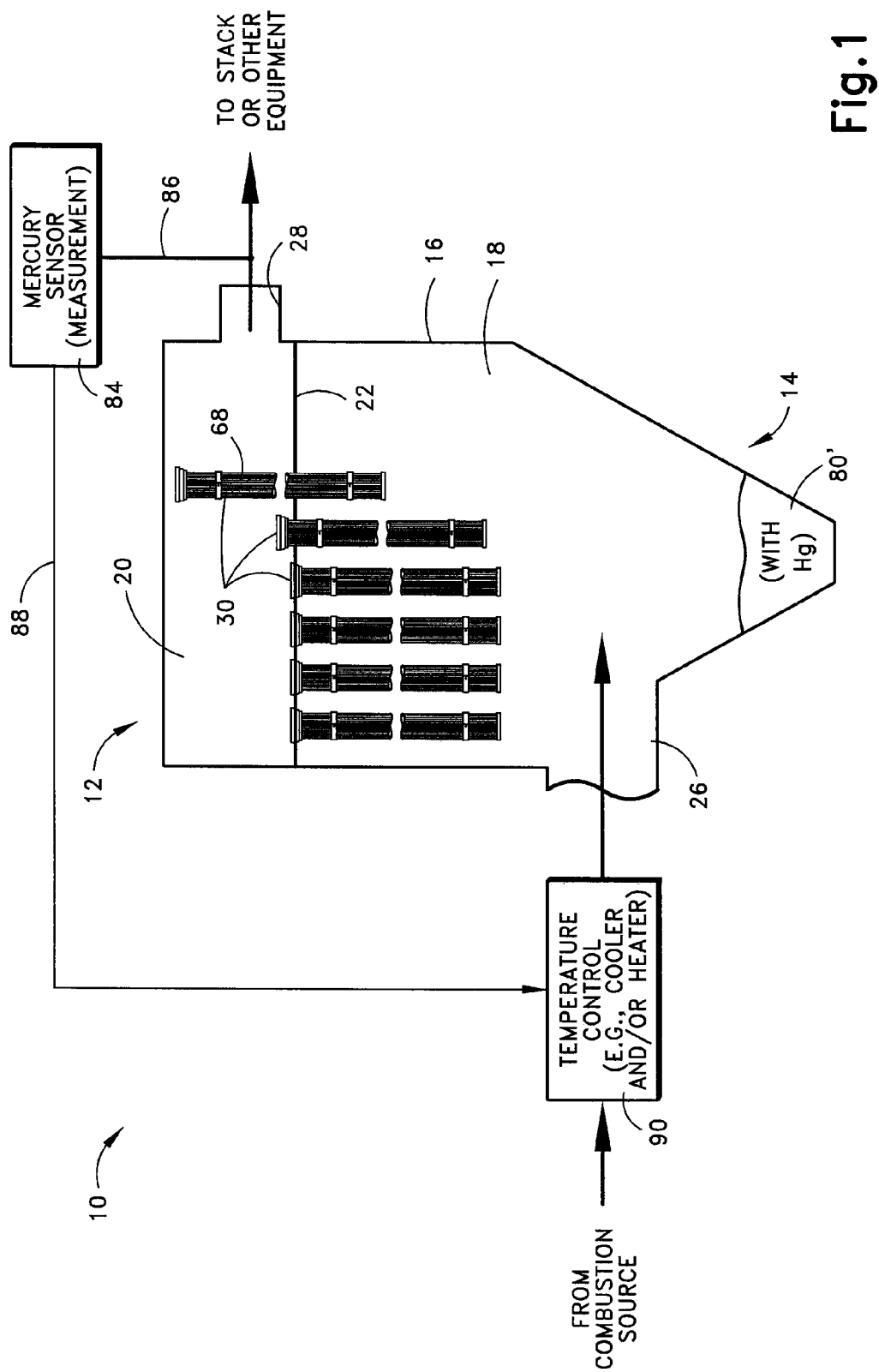
FIG. 1 schematic illustration of an example filtration system incorporating at least one aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 schematically shows a system 10 for processing combustion exhaust and specifically for providing improved mercury (Hg) removal from the flow that contains the combustion exhaust. The combustion exhaust from the source contains particulate matter. The shown example includes a filtration arrangement 12 for filtering particulate from the combustion exhaust. The particulate includes a material that is commonly referred to as fly ash.

Within the shown example, the filtration arrangement 12 includes a baghouse 14. The baghouse 14 may be defined by an enclosed housing 16 and can be divided into two sections: a dirty air plenum 18 and a clean air plenum 20. The dirty air plenum 18 and the clean air plenum 20 may be placed in fluid communication with each other and separated by a tubesheet 22, which is a wall, a divider, or the like. The dirty air plenum 18 is in fluid communication with a dirty air inlet port 26 allowing the combustion exhaust flow to enter the baghouse 14 through the dirty air inlet port 26. The clean air plenum 20 is in fluid communication with a clean air outlet port 28 allowing filtered air to exit the baghouse 14 through the clean air outlet port 28.

The dirty air plenum 18 and the clean air plenum 20 may be arranged in fluid communication via one or more circular openings formed in the tubesheet 22. Each opening may be sized to accept and hold a filter cartridge 30. Two of the shown filter cartridges 30 are raised off of the tubesheet 22 within FIG. 1 to show that the filter cartridges 30 are inserted into the tubesheet 22. The tubesheet 22 prevents the passage of air through the tubesheet. Instead, air may pass from the dirty air plenum 18 to the clean air plenum 20 through the filter cartridges 30. It is to be appreciated that the filtration arrangement 12 may be varied and specifically the baghouse 14 may be varied. As such, the presented example is not to be taken as a limitation upon the present invention. In particular, although filter cartridges are shown, a different type of filter in accordance with an aspect of the present invention may be utilized. Also, although only six filter cartridges 30 are shown, the filtration arrangement 12 may include any number (i.e., one or more) of filter cartridges 30.

Each example filter cartridge 30 is generally elongate may be arranged parallel (e.g., axes of elongation) to each other in a substantially vertical manner. The filter cartridges 30 are capable of filtering air to remove particulate matter, possibly including fly ash, from the combustion exhaust.

Figure 2:
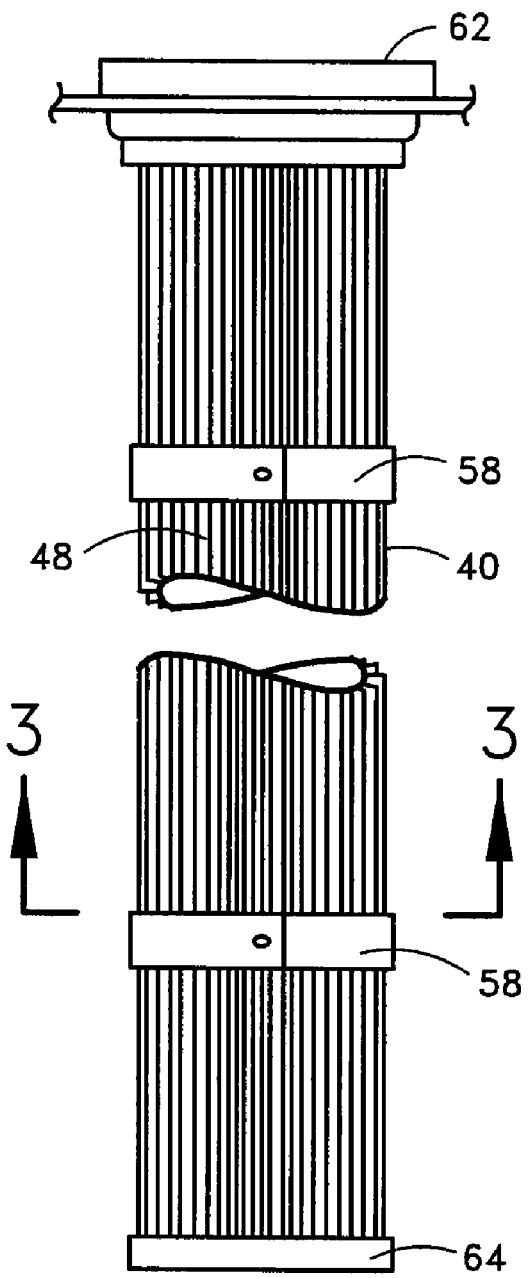
FIG. 2 illustrates a side view of an example filter cartridge that can be used within the system of FIG. 1.
Figure 3:
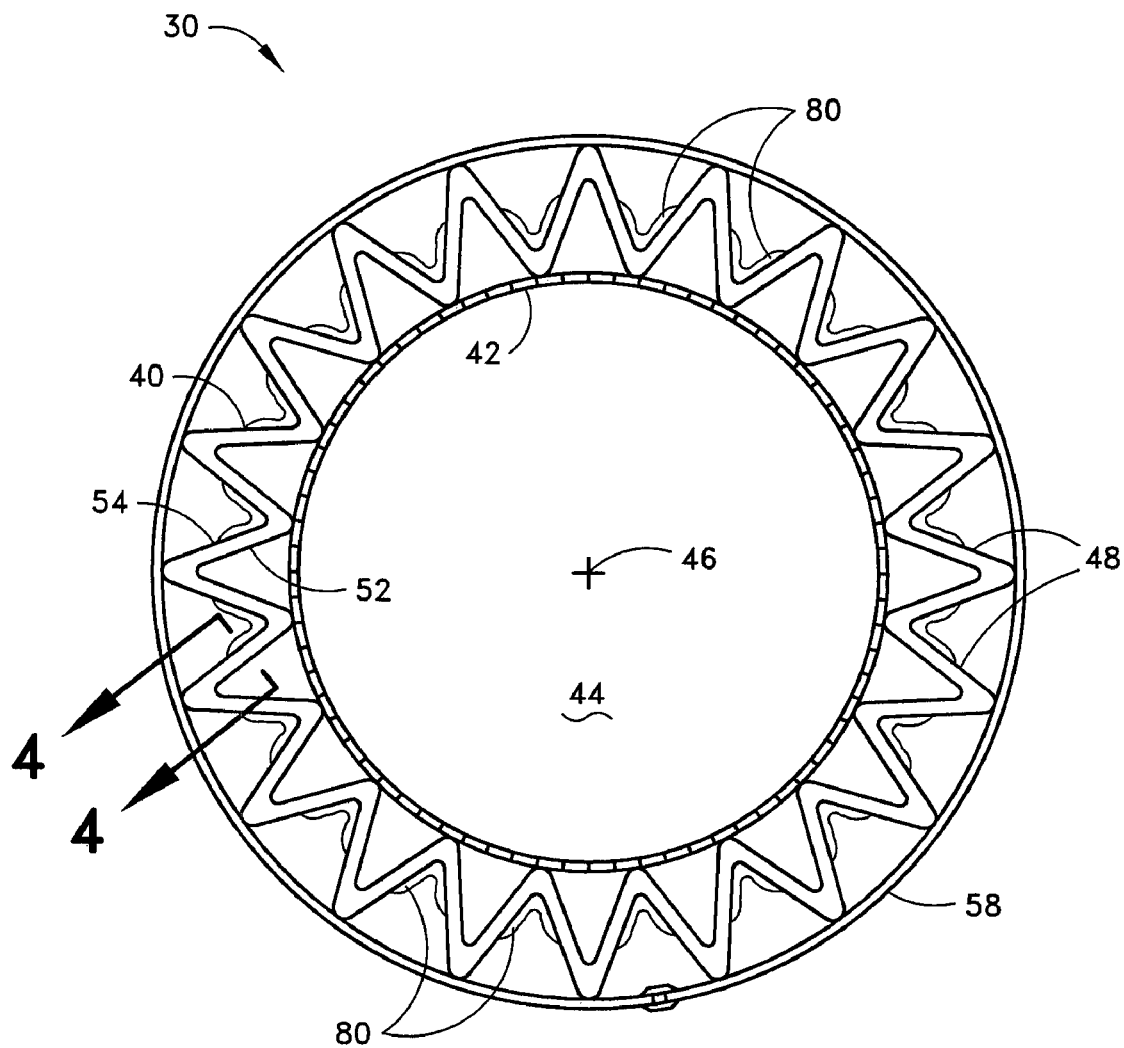
FIG. 3 is an enlarged, cross-sectional view of the filter cartridge taken along line 3-3 of FIG. 2 and shows an accumulation of particulate matter.
Figure 4:
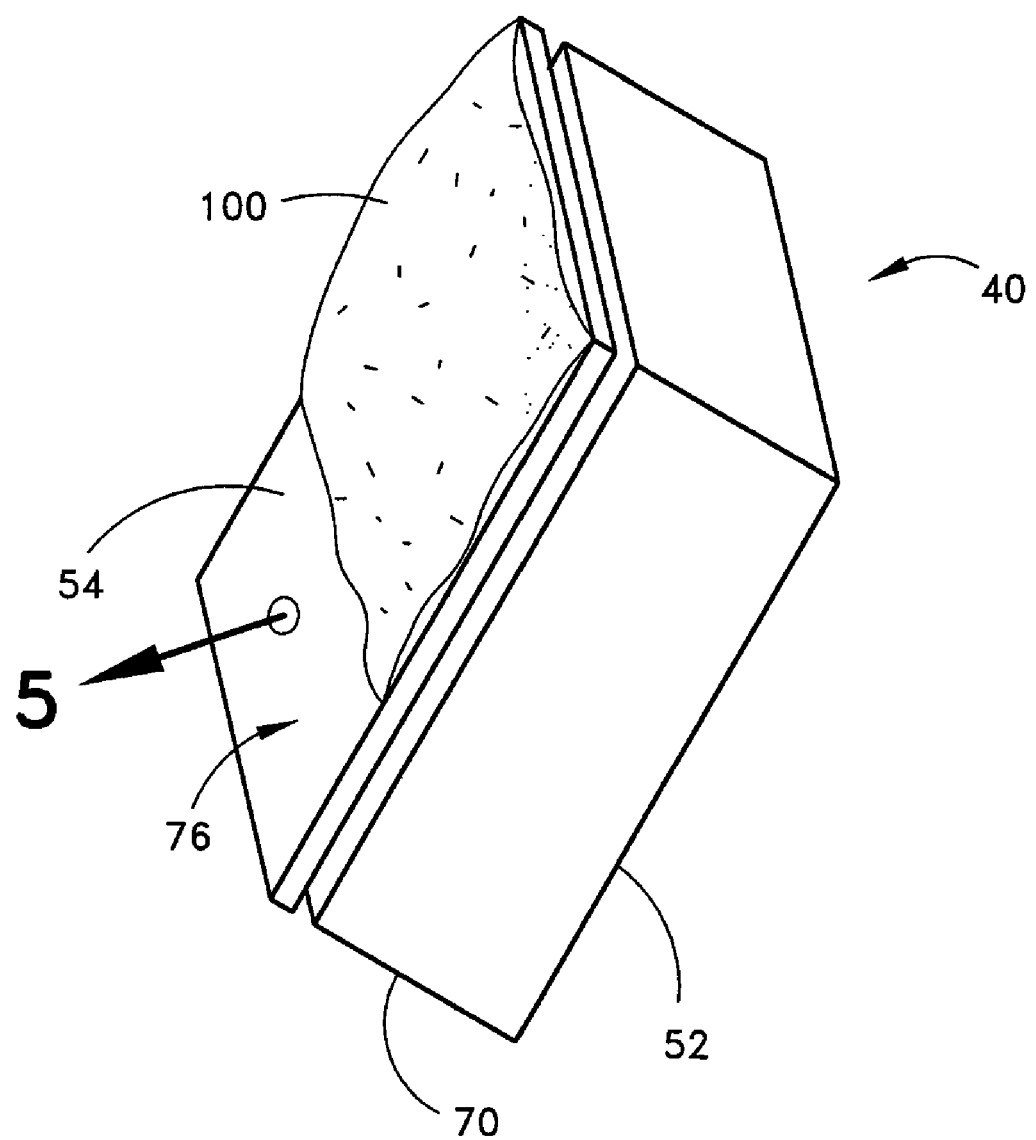
FIG. 4 is an enlarged, cross-sectional view of the filter cartridge taken along line 4-4 of FIG. 3.

As shown in FIGS. 2 and 3, a representative example filter cartridge 30 includes a filter media 40 in accordance with one aspect of the present invention. In the shown example, the filter media 40 is arranged around an inner core 42 (FIG. 3). The inner core 42 defines an elongated central passageway 44 formed within the filter cartridge 30. The elongation is along a center axis 46. The inner core 42 may be made of a number of different materials, such as steel, titanium, or the like, and may be sufficiently stiff to provide some support to the filter cartridge 30. The core 42 includes openings therethrough to allow for the passage of air through the core. For instance, the core 42 may include a plurality of perforations, apertures, holes, etc. to allow air to pass from the exterior of the core to the central passageway 44.

In the shown example (FIGS. 2 and 3), the filter media 40 is arranged generally as a tube to encircle the inner core 42 and has a plurality of pleats 48. The pleats 48 are elongated parallel to the axis and extent in a zigzag pattern toward and way from the center axis 46. The segments between the pleat bends are essentially flat segments. The filter media 40 has an inner surface 52 and an outer surface 54. In the shown embodiment, a portion of the inner surface 52 engages and/or is adjacent to the inner core 42 at the radially inward extent of the pleats 48. Thus, the core 42 can support the filter media 40 from radial inward movement during normal filter flow.

In the shown example, the filter cartridge 30 includes one or more retaining straps 58 used to hold and/or secure the filter media 40 in place. For example, the retaining straps 58 limit radially outward movement during a cleaning pulse. Such retaining straps may include a number of materials with a high tensile strength, including an extruded polymer, woven polyester, metal, high temperature fabric, etc. Also, such retaining straps may be secured around the circumference of the filter media in a number of locations, such as at a central position between the bottom and top of the filter cartridge. Similarly, more than one retaining strap may be provided for securing the filter media, as in the shown example, two retaining straps are used. It is to be appreciated that other structures may be present on the filter cartridge 30.

The filter cartridge 30 may also include one or more end caps 62, 64 (upper and lower) at either or both ends of the filter cartridge. The end caps 62, 64 may act to allow and/or prevent the passage of air through an end of the filter cartridge and ensure that flow is only through the filter media 40 to aid the filtering process. The caps may include rigid members, seals, etc. as will be appreciated by the person of ordinary skill in the art. Also in the shown example, the lower end cap 64 provides for complete blocking, whereas the upper end cap 62 provides for perimeter sealing and is open at a center to permit air flow out from the central passageway 44.

It is to be appreciated that the filter media 40 may have a variety of constructions/compositions. For example, the filter media 40 may include a layer of expanded polytetrafluoroethylene (ePTFE) membrane layer 76. It is to be appreciated that the ePTFE membrane layer 76 may be supported by other structures/layers of the filter media. For example, the filter media may include a media substrate layer 70. The media substrate layer 70 may include a variety of materials and/or constructions. For example, the media substrate layer 70 may include the following materials: polytetrafluoroethylene (PTFE), polyethylene, polyphenylene sulfide (PPS), and/or glass fibers. Also for example, the media substrate layer 70 may include a single, mono-material layer, multiple material layers, and/or other structures. It is to be appreciated that the media substrate layer 70 need not be a limitation upon the present invention. An example of particulate matter 80 entrapped by the filtration arrangement 12 is on the outer surface 54 of the filter media 40. It is to be appreciated that particulate matter 80' (FIG. 1) is generally accumulated within the dirty air plenum 18 of the filtration arrangement 12 and may be collected for disposition (e.g., disposal, sale).

Of course, it is to be understood that the shown filtration arrangement, filter, filter media, etc. are just presented as an example. Differences in the filtration arrangement, the filter, the filter media, etc. are possible and contemplated. For example, round bag filters could be used. As another example, the filter media may have additional/different materials or/fabrics.

It is to be appreciated that the filtration arrangement 12 has at least some ability to remove mercury from the combustion exhaust flow. Such ability to remove mercury may be in combination with the remove of the particulate matter 80 (e.g., fly ash) from the combustion exhaust flow proceeding through the filter arrangement. The details of the mechanism/methodology of removing mercury may be varied and need not be a specific limitation upon the present invention. Some example details of mechanisms/methodologies of removing mercury are presented below.

In connection with one example mechanism/methodology of removing mercury it has been noted that mercury within combustion exhaust is typically elemental mercury. Such elemental mercury does have an ability to pass through some previous types of filter arrangements. However, it should also be noted that the combustion exhaust typically includes hydrochloric acid (HCl). It is theorized the hydrochloric acid within the combustion exhaust can collect at the filter element (e.g., filter media 40/filter cartridge 30) of the filtration arrangement 12. It is further theorized that the hydrochloric acid can oxidize the elemental mercury into mercuric chloride.

It is still further theorized that the presence of the particulate matter 80 provides a substance that captures the created mercuric chloride. Thus, the mercury, which is now if the form of mercuric chloride, is entrapped within the filtration arrangement 12 with the particulate matter 80 and removed from the combustion exhaust flow. As such, the overall amount of mercury that is entrapped by the filtration arrangement 12 is relatively high. See the example within FIG. 1 which shows a representative accumulation of the particulate matter 80', with the captured mercury, that is accumulated within the dirty air plenum 18 of the filtration arrangement 12.

It should be noted that it is possible to introduce a sorbent into the combustion exhaust. The sorbent is often activated carbon which is capable of absorbing or capturing the mercury. Such a sorbent is also entrapped by the filtration arrangement 12 and thus part of the particulate matter 80. Thus again, mercury is entrapped and removed from the combustion gas flow. The example system 10 can optionally provide for the use of such a sorbent. However, since there is a mechanism to stop the flow of mercury (i.e., created of mercuric chloride and capture of the created mercuric chloride by particulate matter 80), the use of sorbent may be minimized or eliminated.

It is to be appreciated that all the examples concerning the filtration arrangement 12 provide examples of filtration means for removing material, including mercury, from the flow proceeding through the filtration means.

The ability of the filtration arrangement 12, regardless of the mechanism/methodology of removing mercury from the flow, may have an efficiency (i.e., ability to remove the mercury) that is temperature dependent. For example, it is theorized that the collection of the hydrochloric acid at the filter element of the filtration arrangement 12, and/or the oxidation of the elemental mercury by the hydrochloric acid into mercuric chloride and/or the capture of the created mercuric chloride by the particulate matter 80 may vary dependent upon temperature. In other words, the temperature of the combustion exhaust flow that is proceeding through the filtration arrangement 12 may affect the effectiveness of the mercury removal.

In accordance with an aspect of the present invention, a concentration (e.g., an amount) of mercury within the flow proceeding from the filtration arrangement 12 (i.e., after the filtration arrangement 12 has had an opportunity to remove mercury) is sensed. A mercury continuous emission monitoring system (HG CEMS) 84 is an example sensor arrangement for sensing mercury is schematically shown within the example of FIG. 1 and is operatively connected 86 to sense the post-filter combustion exhaust flow proceeding from the filtration arrangement 12. The sensor arrangement provides, as an output, a signal 88 indicative of the sensed mercury concentration.

In accordance with an aspect of the present invention, the temperature of the flow (i.e., with the combustion exhaust) proceeding to the filtration arrangement 12 is changed. The change in temperature is for the purpose of changing the effectiveness of the mercury removal that is occurring at the filtration arrangement 12. In accordance with an aspect of the present arrangement, the change of the temperature is in response to the sensed mercury concentration signal 88.

The HG CEMS 84 may have any one or more systems/sensors that can detect and measure the concentration (e.g., amount) of mercury within the flow proceeding from the filtration arrangement 12. It is to be appreciated that the specific location of the HG CEMS 84 need not be a specific limitation upon the invention and that thus the sensor arrangement can be located anywhere downstream from the filtration function. For example, the HG CEMS 84 can be within the clean air plenum 20 of the baghouse 14, as/at a separate unit outside of the baghouse 14 (as shown within the example of FIG. 1), or even downstream of some other component(s) (not shown) in the path that the flow proceeds along to eventual discharge to ambient atmosphere (e.g., via a stack or possible though other equipment such as further pollution processing equipment).

The signal 88 conveys information of the sensed mercury concentration. The signal can be of any form. For example, the signal can be an analog or a digital electrical signal. The signal can convey information is any format. For example, the mercury concentration information can be represented via an electrical property (e.g., current or voltage) of a signal or conveyed by a numeric value representation within the signal (e.g., a code). It is to be appreciated that the signal 88 is shown as a schematic representation and that the signal can be conveyed via a hardwired connection, wireless link, or other connection/link. In summary, the HG CEMS 84, which may have any one or more sensors that can measure the concentration (e.g., amount) of mercury within the flow proceeding from the filtration arrangement 12, provide examples of sensor means for sensing a mercury concentration within the flow downstream of the filtration arrangement and for providing a signal indicative of the sensed mercury concentration.

As an example to provide one or more of the aspects of the invention, the example system of FIG. 1 includes a temperature control arrangement 90 that can change a temperature of the combustion exhaust proceeding to the filtration arrangement 12. The temperature control arrangement 90 may include one or more elements/structures for cooling the combustion exhaust and the temperature control arrangement 90 may include one or more elements/structures for heating the combustion exhaust. The elements/structures may even selectively provide both cooling and heating. The specific details of the elements/structures need not be specific limitations upon the present invention.

One example approach for cooling includes a spraying-introduction of fine water mist into the combustion exhaust. As another alternative, relatively cooler, ambient air is introduced to mix with the combustion exhaust. Such examples for cooling the combustion exhaust are examples of means for cooling the combustion exhaust. An example approach for heating includes employing electrical heating coils to warm the combustion exhaust. Such an example for heating the combustion exhaust is an example of means for heating the combustion exhaust. It is to be appreciated that adjustment of the temperature may include cooling or heating. However, typically cooling of the combustion exhaust is the desired course of action.

The temperature control arrangement 90 is operatively connected/arranged to receive the signal 88 indicative of the sensed mercury concentration from the HG CEMS 84. The change in temperature caused by the temperature control arrangement 90 is in response to the signal 88 indicative of the sensed mercury concentration. Thus, if there is a desire to capture (entrap) more (or less) mercury, the temperature is changed. As mentioned, the entrapment of mercury at the filtration arrangement 12 is temperature dependent. The system 10 can be set-up as an automatic feedback loop in which the temperature of the dirty flue gas entering the baghouse 14 of the filtration arrangement 12 is adjusted in response to the mercury concentration in the exiting flow.

It is to be appreciated that all the examples concerning the temperature control arrangement 90 provide examples of temperature control means for changing a temperature of the combustion exhaust proceeding to the filtration arrangement in response to the signal indicative of the sensed mercury concentration.

It is to be appreciated that the specific location of the temperature control arrangement 90 need not be a specific limitation upon the invention and that thus the temperature control arrangement 90 can be located anywhere upstream of the filtration function or even in conjunction with the filtration function. For example, the temperature control arrangement 90 can be a separate unit outside of the baghouse 14 (as shown within the example of FIG. 1), within the baghouse (e.g., within the dirty air plenum), or even upstream of some other component(s) (not shown) in the path that the flow proceeds toward the filtration arrangement 12.

As mentioned, some particulate matter 80 is accumulated on the outer surface 54 the filter media 40 of the filter media. The presence of the particulate matter 80 helps in entrapment of mercury. It is to be appreciated that the particulate matter 80 may include fly ash from the combustion exhaust. It is to be appreciated that the particulate matter 80 may include introduced sorbent (e.g., activated carbon). Such sorbent may be injected by an arrangement that is not shown with the example of FIG. 1. It is to be appreciated that accumulation of particulate matter 80 may be due to a geometry (e.g., pleats 48) of the filter cartridge 30. Also, it is to be appreciated that some filter materials (e.g., ePTFE) may enhance an ability to of the arrangement to entrap mercury.

It is worth noting that while the introduction or injection of a sorbent (e.g., activated carbon) into combustion exhaust certainly has a potential benefit of aiding to capture mercury, the introduction of such a sorbent may have consequences. In particular, the introduced sorbent may mix with the fly ash that is being captured by the filtration arrangement 12. It should be noted that fly ash may have value as a byproduct of the filtration of the combustion exhaust. For example, fly ash may be sold for use in production of cement. However, the presence of sorbent (e.g., activated carbon) within the fly ash may have a consequence of rendering the fly ash to be less desirable for use in such cement production. Thus, the use of activated carbon may have a consequence of reduced revenues that may have been generated from the collection and sale of fly ash. Moreover, activated carbon itself has a cost of acquisition. It is easily understood that the overall cost of the activated carbon is proportional to amount of activated carbon that is utilized. Thus, it might be beneficial to reduce sorbent use. The present invention may provide such benefits.

Within one example in which sorbent (e.g., activated carbon) was not injected (i.e., the particulate for capture of mercuric chloride at the surface area of the ePTFE membrane layer 76 was only the fly ash), a mercury capture rate of approximately 98 percent was achieved when the combustion exhaust entering the baghouse 14 was cooled to 280° F. (approximately 138° C.). In comparison, a typical temperature for combustion exhaust entering the bag house is around 345° F. (approximately 174° C.). Thus, in such an example, the need for sorbent is greatly reduced or possibly eliminated.

Also, since the use of measured (monitored) mercury is used, in a feedback approach, to control temperature via the temperature control arrangement 90, the adjustments (i.e., changes) to the temperature can be done in a real-time approach. Specifically, the temperature of the combustion exhaust can continuously be adjusted and/or the cooling/heating applied to the combustion exhaust can be adjusted to maintain a desired temperature of the combustion exhaust. It is possible that the mercury within the combustion exhaust can vary over time. Such mercury variation may be due to one or more factors. Possible examples of such factors include variations in the amount/type of fly ash in the combustion exhaust, gas chemistry within the combustion exhaust, combustion exhaust gas flow rate, filter media condition (e.g., deterioration thereof), dust-cake build-up, etc. One aspect of the present invention is to be able to make a responsive adjustment, via the temperature adjustment, to cause a change is mercury capture (e.g., removal from the flow of the combustion exhaust). The adjustment can be continuous and/or repetitive.

Figure 5:
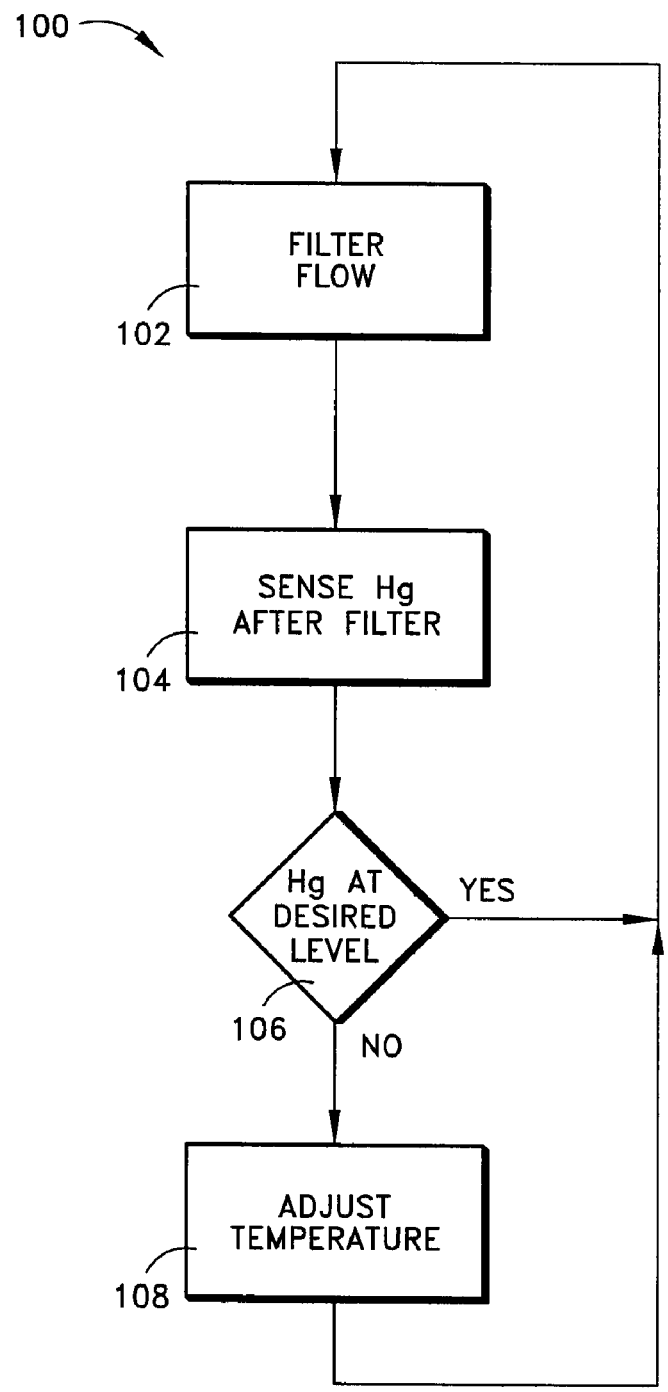
FIG. 5 is a top level flow chart of an example method in accordance with an aspect of the present invention.

FIG. 5 is a top level flow chart for an example method 100 in accordance with the present invention. Although the flow chart presents method steps in a linear sequence, it is to be appreciated that the steps may actually be done continuously and simultaneously. The linear sequence presentation is merely to present the method steps in a manner for ease of understanding. At step 102, the combustion exhaust is passing through the filtration arrangement. At step 104, the post-filtered flow is sensed to measure the mercury that is present. At step 106, it is determined if the mercury is at a desired level. If the sensed mercury is at a desired level (the answer to the determination at step 106 is YES), the method 100 loops so that steps 104 and 106 are simply repeated. However, if the sensed mercury is not at a desired level (the answer to the determination at step 106 is NO), the method 100 proceeds to step 108 in which the temperature of the combustion exhaust proceeding toward the filtration arrangement is adjusted. It should be noted that the temperature adjustment may include reducing or increasing the temperature. It should also be appreciated that the method may include other steps and/or the presented steps may include sub-steps.

In summary, the present invention can provide a system for improved mercury removal from a flow containing combustion exhaust. The system includes a filtration arrangement through which the flow proceeds to remove material, including mercury, from the flow. The system includes a sensor arrangement sensing a mercury concentration level within the flow downstream of the filtration arrangement and providing a signal indicative of the sensed mercury concentration. The system includes an adjustable temperature control arrangement changing a temperature of the combustion exhaust proceeding to the filtration arrangement in response to the signal indicative of the sensed mercury concentration.

The system may further include that the adjustable temperature control arrangement includes at least a cooler to cool the combustion exhaust and/or the adjustable temperature control arrangement includes at least a heater to heat the combustion exhaust. The system may further include that the sensor arrangement includes at least a sensor that measures whether the mercury concentration within the flow downstream of the filtration arrangement is at a desired concentration and the adjustable temperature control arrangement operates to change the temperature of the combustion exhaust such that the mercury removal at the filtration arrangement changes and the mercury concentration within the flow downstream of the filtration arrangement changes toward the desired concentration. The system may further include that the filtration arrangement includes at least one layer of ePTFE.

Also in summary, the present invention can provide a system for improved mercury removal from a flow containing combustion exhaust. The system includes filtration means for removing material, including mercury, from the flow proceeding through the filtration means. The system includes sensor means for sensing a mercury concentration within the flow downstream of the filtration means and for providing a signal indicative of the sensed mercury concentration. The system includes temperature control means for changing a temperature of the combustion exhaust proceeding to the filtration means in response to the signal indicative of the sensed mercury concentration.

The system may further include that the temperature control means includes means for cooling the combustion exhaust and/or the temperature control means includes means for heating the combustion exhaust. The system may further include that the sensor means includes at least a sensor that measures whether the mercury concentration within the flow downstream of the filtration means is at a desired concentration and the adjustable temperature control means operates to change the temperature of the combustion exhaust such that the mercury removal at the filtration means changes and the mercury concentration within the flow downstream of the filtration means changes toward the desired concentration. The system may further include that the filtration means includes at least one layer of ePTFE.

Also in summary, the present invention can provide a method for improved mercury removal from a flow containing combustion exhaust. The method includes filtering the flow to remove material, including mercury, from the flow proceeding through a filtration arrangement. The method includes sensing a mercury concentration within the flow downstream of the filtration arrangement and for providing a signal indicative of the sensed mercury concentration. The method includes changing a temperature of the combustion exhaust proceeding to the filtration arrangement in response to the signal indicative of the sensed mercury concentration.

The method may further include that the step of changing a temperature of the combustion exhaust includes cooling the combustion exhaust. The method may further include that the step of changing a temperature of the combustion exhaust includes heating the combustion exhaust. The method may further include that the step of sensing a mercury concentration includes sensing whether the mercury concentration within the flow downstream of the filtration arrangement is at a desired concentration and the step of changing a temperature of the combustion exhaust includes changing the temperature of the combustion exhaust such that the mercury removal at the filtration arrangement changes and the mercury concentration within the flow downstream of the filtration means changes toward the desired concentration. The method may further include that the step of filtering the flow to remove material filtration includes filtering though at least one layer of ePTFE.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A system for improved mercury removal from a flow containing combustion exhaust; the system including:
   a filtration arrangement through which the flow proceeds to remove material, including mercury, from the flow;
   a sensor arrangement sensing a mercury concentration within the flow downstream of the filtration arrangement and providing a signal indicative of the sensed mercury concentration; and
   an adjustable temperature control arrangement changing a temperature of the combustion exhaust proceeding to the filtration arrangement in response to the signal indicative of the sensed mercury concentration to change an amount of mercury being removed from the flow.

2. A system as set forth in claim 1, wherein the adjustable temperature control arrangement includes at least a cooler to cool the combustion exhaust.

3. A system as set forth in claim 1, wherein the adjustable temperature control arrangement includes at least a heater to heat the combustion exhaust.

4. A system as set forth in claim 1, wherein the sensor arrangement includes at least a sensor that measures whether the mercury concentration within the flow downstream of the filtration arrangement is at a desired concentration and the adjustable temperature control arrangement operates to change the temperature of the combustion exhaust such that the mercury removal at the filtration arrangement changes and the mercury concentration within the flow downstream of the filtration arrangement changes toward the desired concentration.

5. A system as set forth in claim 1, wherein the filtration arrangement includes at least one layer of ePTFE.

6. A system as set forth in claim 1, wherein the adjustable temperature control arrangement includes at least one of a cooler to cool the combustion exhaust and a heater to heat the combustion exhaust.

7. A system for improved mercury removal from a flow containing combustion exhaust; the system including:
   filtration means for removing material, including mercury, from the flow proceeding through the filtration means;
   sensor means for sensing a mercury concentration within the flow downstream of the filtration means and for providing a signal indicative of the sensed mercury concentration; and
   temperature control means for changing a temperature of the combustion exhaust proceeding to the filtration means in response to the signal indicative of the sensed mercury concentration to change an amount of mercury being removed from the flow.

8. A system as set forth in claim 7, wherein the temperature control means includes means for cooling the combustion exhaust.

9. A system as set forth in claim 7, wherein the temperature control means includes means for heating the combustion exhaust.

10. A system as set forth in claim 7, wherein the sensor means includes at least a sensor that measures whether the mercury concentration within the flow downstream of the filtration means is at a desired concentration and the adjustable temperature control means operates to change the temperature of the combustion exhaust such that the mercury removal at the filtration means changes and the mercury concentration within the flow downstream of the filtration means changes toward the desired concentration.

11. A system as set forth in claim 7, wherein the filtration means includes at least one layer of ePTFE.

12. A system as set forth in claim 7, wherein the temperature control means includes at least one of means for cooling the combustion exhaust and means for heating the combustion exhaust.

13. A method for improved mercury removal from a flow containing combustion exhaust; the method including:
   filtering the flow to remove material, including mercury, from the flow proceeding through a filtration arrangement;
   sensing a mercury concentration within the flow downstream of the filtration arrangement and for providing a signal indicative of the sensed mercury concentration; and
   changing a temperature of the combustion exhaust proceeding to the filtration arrangement in response to the signal indicative of the sensed mercury concentration to change an amount of mercury being removed from the flow.

14. A method as set forth in claim 13, wherein the step of changing a temperature of the combustion exhaust includes cooling the combustion exhaust.

15. A method as set forth in claim 13, wherein the step of changing a temperature of the combustion exhaust includes heating the combustion exhaust.

16. A method as set forth in claim 13, wherein the step of sensing a mercury concentration includes sensing whether the mercury concentration within the flow downstream of the filtration arrangement is at a desired concentration and the step of changing a temperature of the combustion exhaust includes changing the temperature of the combustion exhaust such that the mercury removal at the filtration arrangement changes and the mercury concentration within the flow downstream of the filtration means changes toward the desired concentration.

17. A method as set forth in claim 13, wherein the step of filtering the flow to remove material filtration includes filtering though at least one layer of ePTFE.

18. A method as set forth in claim 13, wherein the step of changing a temperature of the combustion exhaust includes at least one of cooling the combustion exhaust and heating the combustion exhaust.

* * * * *